(No Model.) 2 Sheets—Sheet 1.
T. B. ANDERSON.
BRICK KILN.
No. 290,512. Patented Dec. 18, 1883.
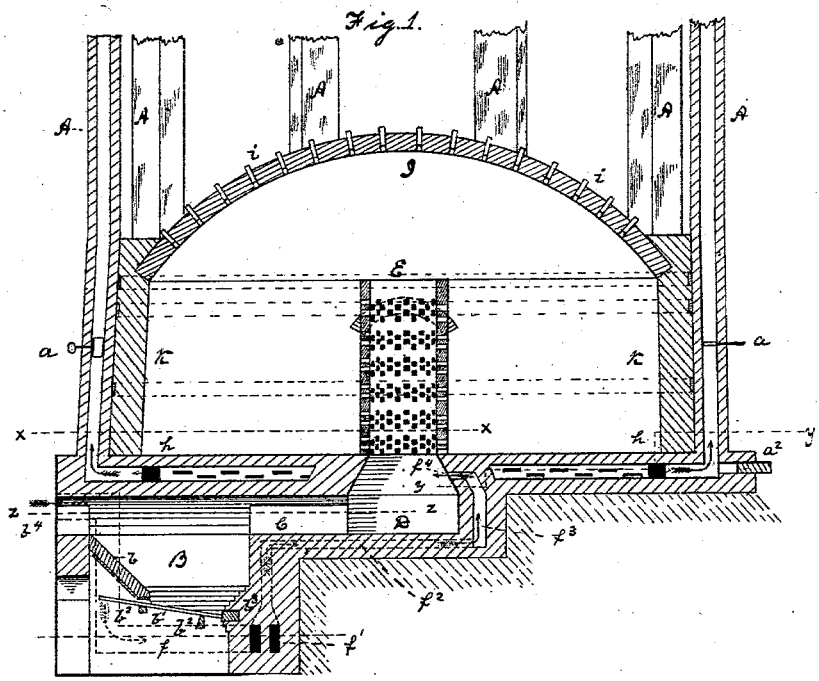
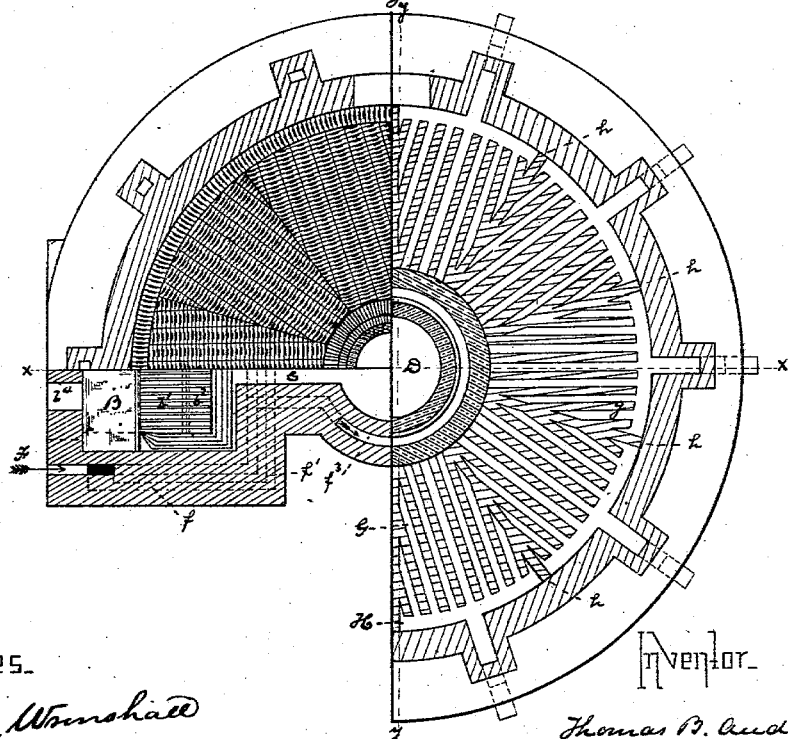
Witnesses
R. C. Wanshall
J. A. Burns
Inventor
Thomas B. Anderson
by his attorneys
Bakewell & Kerr (No Model.)
T. B. ANDERSON.
BRICK KILN.
No. 290,512. Patented Dec. 18, 1883.
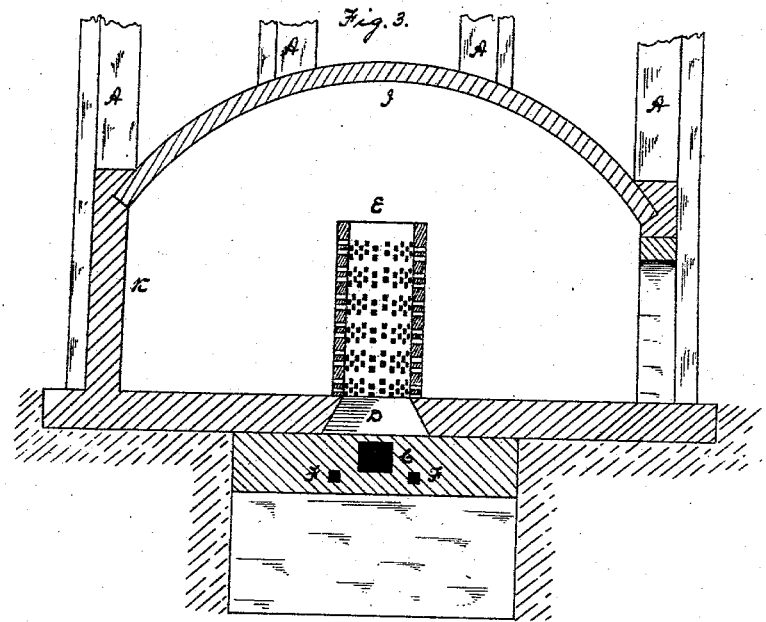
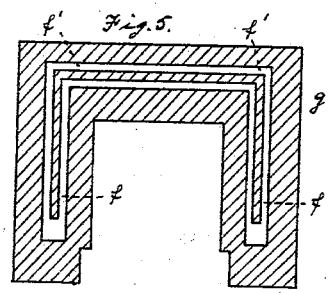
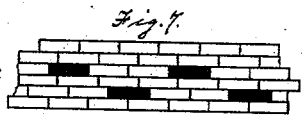
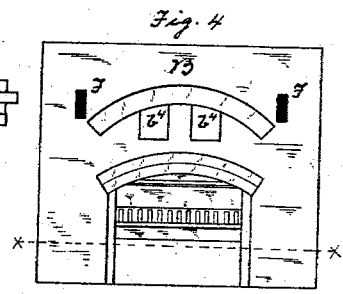
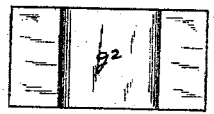
Witnesses
R. C. Wmshall
J. A. Burns.
Inventor
Thomas B. Anderson
by his attorneys
Bakewell & Kerr

UNITED STATES PATENT OFFICE.

THOMAS B. ANDERSON, OF ALLEGHENY, PENNSYLVANIA.

BRICK-KILN.

SPECIFICATION forming part of Letters Patent No. 290,512, dated December 18, 1883.

Application filed September 24, 1883. (No model.)

*To all whom it may concern:*

Be it known that I, THOMAS B. ANDERSON, of Allegheny, in the county of Allegheny and State of Pennsylvania, have invented a new and useful Improvement in Brick-Kilns; and I do hereby declare the following to be a full, clear, and exact description thereof.

My invention consists in the construction and arrangement of brick-kilns; and it has for its object the production of an even heat throughout all parts of the kiln, as will hereinafter more fully appear.

I will now describe my invention, so that others skilled in the art to which it appertains may apply the same, reference being had to the accompanying drawings, forming part of this specification, in which—

Figure 1 is a vertical sectional view of the kiln and gas-producer on the line $x\ x$, Fig. 2. Fig. 2 is a horizontal sectional view on the lines $x\ x$, $y\ y$, and $z\ z$, Fig. 1. Fig. 3 is a vertical sectional view on the line $y\ y$, Fig. 2. Fig. 4 is a front elevation of the gas-producer. Fig. 5 is a horizontal sectional view of the same on the line $x\ x$, Fig. 4. Fig. 6 is a detached plan view of the bricks forming the floor of the kiln, and Fig. 7 is a side elevation of a portion of the partition-walls between the radiating flues.

Like letters of reference indicate like parts wherever they occur.

I prefer to build the kiln, as shown in the drawings and hereinafter described, round or circular in form, having stacks A, built in and extending above the outer wall, arranged at certain distances from each other, having a gas-producer, B, situated under the kiln at one side, and communicating by means of a flue, C, with a gas or combustion chamber, D, situated below the center of the kiln, an eye, E, extending from the chamber D to the upper portion of the kiln, air-flues F F, leading from the outer wall of the gas-producer and extending downward to a point below the fire-chamber, thence to a point in the rear of the same, thence up behind the gas-producer and under the gas-flue C, under and back of the chamber D, discharging the air along and around the rear wall of the chamber D, into the chamber near the top thereof below the eye E, and radial flues G, for the passage of the products of combustion after they have passed through the brick in the kiln, said flues radiating from the outer wall of the eye E at the base thereof, to and communicating with the flue H, which extends around the kiln at the base thereof, and opens into the stacks A.

The gas-generator B, which may be similar in form to gas-producers or generators now in common use in connection with metallurgical and other regenerator furnaces, is situated under the kiln at one side thereof. The sides or walls $b$ extend down, sloping inwardly to the bottom or grate bars, $b'$, and are formed of fire-brick. The grate-bars $b'$ are supported by the transverse bearing-bars $b^2$, and at their rear ends by the fire-brick tile or bricks $b^3$, which are less liable to be destroyed by the heat than an iron or other supporting-bar.

At the upper portion of the producer, extending through the front wall, is a mouth or mouths, $b^4$, through which the fuel is supplied. These mouths are closed by suitable doors. The flue C, which connects the producer B with the chamber D, opens into the chamber of the gas-producer at or near the top thereof in the rear wall, and extends in a straight line to and opens into the chamber D through the side wall at the bottom thereof. The chamber D, which is circular in form, situated below and under the center of the kiln, is also lined with fire-brick. The wall of this chamber, which extends upward to the base of the eye E, slopes inwardly slightly. The eye E, above the chamber D, is also circular in form and extends up into the kiln at the center thereof to a point on a level with the upper row of bricks to be burned in the kiln. The wall of the eye is formed in checker-work, the purpose of which is to insure the heating and burning of the brick next to the eye and to equalize the heat throughout the kiln.

In order to produce the combustion of the gases which pass off from the generator B, air is admitted into the chamber D, at the top thereof, by means of suitable air-flues. These flues F F open through the outer wall of the gas-producer at the side of the mouths $b^4$, and extend thence within the walls of the producer vertically downward to a point below the level of the grate-bars $b'$. Thence they extend horizontally, as shown by the letters $f\!f$, to a point in the rear of the fire-chamber of the producer, where they extend by the passages $f'f'$ in the rear of the chamber of the producer horizontally at right angles to the line of the passages $ff$.

Above the passages $f'f'$, and communicating therewith, are flues or passages $f^2$, extending upward back of the chamber of the producer to a point below the level of the flue C, and thence horizontally to and into a flue, $f^3$, which extends around the side and rear wall of the chamber D, and opens into the chamber by suitable ports or openings, $f^4$, near the top thereof, below the eye E.

The kiln is built either circular, square, or of other suitable shape, having a dome-shaped roof, I, and vertical side walls, K.

At the bottom of the kiln are the horizontal flues G, which radiate toward and communi- with a flue, H, extending around the bottom of and within the kiln.

The side partition-walls, $g$, of the radiating flues G are formed of fire-brick built in checker-work, as shown in Fig. 7, so that the flues communicate one with the other through the openings formed thereby. Radiating from the eye E are four or more solid division-walls, $h$, which extend to and through the flue H, dividing the flue H and the flues G into four or more separate sections, each of which sections has an outlet through one of the stacks A. On top of these walls $g$ is laid the floor of the kiln, which is formed of fire-brick or tile $g'$, placed side by side on the walls $g$ over the flues G. These tiles $g'$ are guttered, as at $g^2$, so as to form passages extending vertically through the floor into the flues G. These radiating flues G all terminate in the flue H, which extends around the wall of the kiln and is divided into sections by the transverse partition-walls $h$. Communicating with each one of these sections is a stack A, built outside of the wall of the kiln and having a damper, $a$, by means of which the draft at any part of the furnace may be increased or lessened.

In the dome or roof of the kiln are openings $i$, which are closed by removable bricks or tile the purpose of which is to permit of the escape of water smoke through the top of the kiln and to enable the bricks after they have been burned to cool more rapidly.

At the bottom of the stacks A openings $a^2$ are formed, which are closed by removable brick or tile. The purpose of these openings is also to hasten the cooling of the bricks after they have been burned in the kiln.

The operation is as follows: The kiln having been filled with green bricks in the usual manner, they being built one on the other, so as to form a checker-work, and a fire having been started in the chamber of the gas-producer, slack or fine bituminous coal is fed therein, and the gas and products of combustion produced therefrom pass through the flue C into the chamber D. At the same time air passing through the flues F, and being heated thereby, enters the upper portion of the chamber D through the ports $f^5$, mingles with the gas in the chamber, and a vivid and perfect combustion of the gas and air takes place in the eye E. The heat which is thus produced passes out at the top of the eye, spreads in the upper part of the kiln, and is drawn down through the checker-work of green brick by the draft caused by the stacks A through the openings in the floor formed by the gutters $g^2$ into the flues G, and thence through the flues into the flue H and stacks A.

As the stacks A are arranged around the outer wall of the kiln, the draft is from the center of the kiln toward the walls. In order therefore to insure the perfect burning of the bricks around the eye, the checker-work or openings $c$ are formed in the wall of the eye, so as to allow a certain amount of heat to be drawn therethrough. The checker-work in the partition-walls $g$ is also for the purpose of regulating and equalizing the heat, by providing a passage for the heat from one flue to the other, should the draft through any one of the flues be lessened or imperfect. By means of the dampers $a$ the draft through any one of the stacks may be increased or lessened, and the intensity of the heat in any part of the kiln regulated thereby.

When the fire is first started in the gas-producer, the bricks which close the openings $i$ in the top of the kiln should be removed to permit the water smoke to pass through the openings instead of through the bricks and out at the stacks; otherwise the moisture contained in the smoke would be absorbed by the bricks, and those in the lower part of the kiln, being softened, would be crushed and spoiled by the weight of the upper layers. After the bricks have been thoroughly burned, the fire in the gas-producer is allowed to die out, and the bricks which close the openings $i$ are again removed, also the bricks which close the openings $a^2$. This produces a draft of cold air, which enters through the openings $a^2$, passes through the bricks in the kiln, and out through the openings $i$. This draft of air hastens the cooling of the bricks. When the bricks have become cold, they are removed from the kiln and a fresh charge of green bricks is introduced.

The advantages of my invention are the simplicity and durability of the kiln, and the accurate regulation of the heat therein by means of which the bricks are rapidly and evenly burned.

Another material advantage is the exclusion of cold air from the interior of the kiln during the burning operation; also, the kiln is much more durable than the forms heretofore in common use.

Although I have described the kiln as adapted to burn bricks, pipes, tiles, and like articles may be burned therein.

Having thus described my invention, what I claim, and desire to secure by Letters Patent, is—

1. A kiln for burning bricks, having a central combustion-chamber, a series of radiating flues having perforated top and side partition-walls, said series of flues being divided into sections by solid partition-walls, each of which sections communicates with a stack at the outer wall of the kiln, having a damper arranged therein, substantially as and for the purpose specified.

2. A kiln having openings formed in the roof and around or along the outer wall at or near the bottom thereof, which openings may be closed or opened, in combination with flues having perforated top and side walls radiating toward the outer wall of the kiln, and communicating with the openings at the bottom of the kiln, substantially as and for the purpose specified.

In testimony whereof I have hereunto set my hand this 17th day of September, A. D. 1883.

THOMAS B. ANDERSON.

Witnesses:
W. B. CORWIN,
THOMAS W. BAKEWELL.